3,661,825
STABILIZATION SYSTEMS FOR POLYMERS
James W. Horvath, Cuyahoga Falls, Ohio, and Charles
A. Markley, West Chester, Pa., assignors to The Goodyear Tire & Rubber Company, Akron, Ohio
Filed Apr. 21, 1970, Ser. No. 30,399
Int. Cl. C08d 11/04
U.S. Cl. 260—23.7 M                                   8 Claims

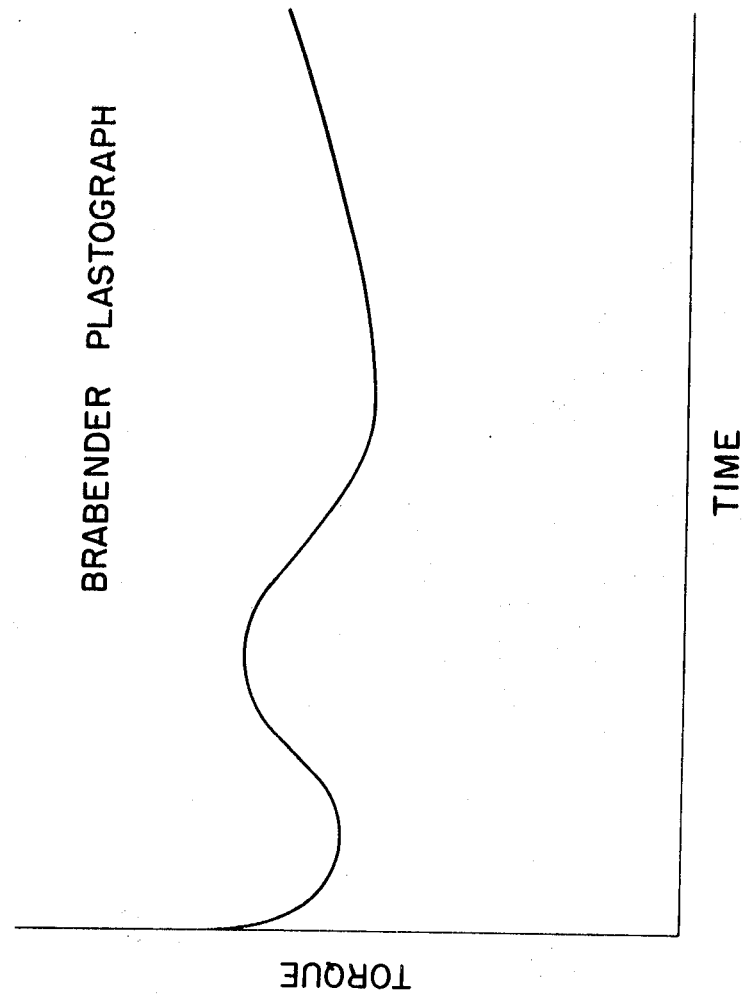

ABSTRACT OF THE DISCLOSURE

Stabilizer systems for polymers containing divinyl benzene (DVB) comprising certain phenolic stabilizers, epoxy polyvinyl chloride stabilizers and other polyvinylchloride stabilizers such as the organo-tin types.

---

This invention relates to stabilizer blends and polymers stabilized with said blends.

Rubbery polymers such as butadiene/styrene copolymers and butadiene/acrylonitrile copolymers are known to be subject to oxidative degradation. It is known to stabilize such polymers against oxidative degradation by the addition of various nondiscoloring antioxidants, including phenolic antioxidants and phosphite antioxidants. Polymers prepared from monomer systems containing divinyl benzene (DVB) present a special stabilization problem. In addition to being subject to oxidative degradation such polymers are also subject to crosslinking on storage and during processing. This post polymerization crosslinking apparently stems from the divinyl benzene used in their manufacture. Such crosslinking is undesirable primarily from a processing standpoint, e.g., processing immediately following the manufacture of the polymer and later processing by the ultimate user of the polymer. This type of reaction differs from oxidative degradation and therefore demands special stabilization systems to aid in the protection of the polymers against this type of reaction. It is therefore desirable to provide a stabilization system which will not only aid in the prevention of this type of crosinking, but which in addition aid in protecting this type of polymer against oxygen degradation. In most instances it is also desirable that the polymer possess a light color. It is therefore often desirable that the stabilizers used impart little color to the polymer, be themselves relatively nondiscoloring and if possible, aid in the prevention of polymer discoloration.

It is an object of this invention to provide stabilizers which will aid in the protection of polymers prepared from monomer systems containing divinyl benzene against oxygen degradation and post polymerization crosslinking stemming from the use of divinyl benzene in their manufacture and to provide polymers so stabilized. It is a further object of this invention to provide stabilizers which will help to protect the DVB polymers against both oxidative degradation and the divinyl benzene type post polymerization crosslinking and to provide polymers so stabilized. It is still another object of this invention to provide stabilizers which will help to protect DVB polymers against post polymerization crosslinking and discoloration and to provide polymers so stabilized.

The objects of this invention are accomplished by a polymer containing (A) 40 to 99.95 parts by weight of bound 1,3-butadiene monomer, (B) .05 to 5.0 parts by weight of bound divinyl benzene monomer and (C) 0 to 59.95 parts by weight of at least one bound monomer selected from the group consisting of styrene and acrylonitrile wherein the sum of (A) plus (B) plus (C) equals 100 parts by weight of polymer and having incorporated therein a stabilizing amount of a stabilizer system comprising (a) at least one phenolic compound selected from the group consisting of compounds conforming to the following structural formulae:

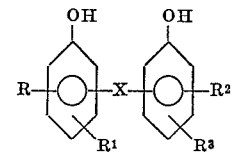

(I)

wherein R, $R^1$, $R^2$ and $R^3$ are selected from the group consisting of hydrogen, alkyl radicals containing 1 to 12 carbon atoms, cycloalkyl radicals containing 5 to 9 carbon atoms and aralkyl radicals containing 7 to 12 carbon atoms and X is selected from the group consisting of

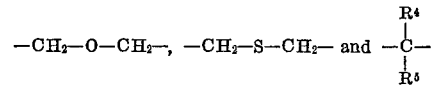

wherein $R^4$ and $R^5$ are selected from the group consisting of hydrogen and alkyl radicals containing 1 to 7 carbon atoms and the sum of the carbon atoms in $R^4$ plus $R^5$ is 0 to 7; and

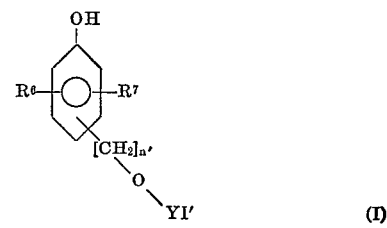

(I)

wherein $R^6$ and $R^7$ are selected from the group consisting of hydrogen, alkyl radicals containing 1 to 12 carbon atoms, cycloalkyl radicals containing 5 to 9 carbon atoms and aralkyl radicals containing 7 to 12 carbon atoms; $n'$ is an integer from 0 to 1; and $Y'$ is selected from the group consisting of hydrogen and alkyl radicals containing 1 to 2 carbon atoms, (b) at least one epoxy stabilizer/plasticizer for polyvinylchloride, and (c) at least one other stabilizer for polyvinyl chloride wherein the entire stabilizer system is incorporated into the polymer prior to substantial post polymerization crosslinking. A preferred stabilizer system contains in addition to components $a$, $b$ and $c$, a fourth component, said fourth component being at least one phosphite compound selected from the group consisting of

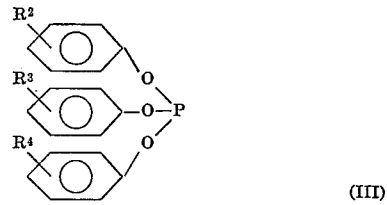

(III)

wherein $R^2$ is selected from the group consisting of alkyl radicals containing 4 to 12 carbon atoms, cycloalkyl radicals containing 5 to 9 carbon atoms and aralkyl radicals containing 7 to 12 carbon atoms and $R^3$ and $R^4$ are selected from the group consisting of hydrogen, alkyl radicals containing 4 to 12 carbon atoms, cycloalkyl radicals containing 5 to 9 carbon atoms and aralkyl radicals containing 7 to 12 carbon atoms.

Preferred phenolic compounds are those conforming to structural Formula I herein wherein X is selected from the group consisting of —$CH_2$—O—$CH_2$— and

—$CH_2$— particularly —$CH_2$—, and those conforming to structural Formula II wherein $R^6$ and $R^7$ are selected from the group consisting of hydrogen, alkyl radicals containing 1 to 7 carbon atoms and cycloalkyl radicals containing 6 to 7 carbon atoms; particularly those wherein n' is 1 and Y' is hydrogen.

Examples of phenolic compounds conforming to the above structural Formulae I and II are as follows:

2,2'-methylenebis(4-methylphenol)
4,4'-isopropylidene bis phenol
α,α'-di(2-hydroxy-5-methylphenyl)dimethylether
α,α'-di(2-hydroxy-5-methylphenyl)dimethyl sulfide
4-methylol phenol
2-methylol-4-methylphenol
4-β-hydroxyethylphenol
2-methoxymethyl-4-methylphenol
4-β-methoxyethylphenol
2,2'-methylene bis(3-α-phenylethyl-5-methylphenol)
4,4'-isopropylidene bis(2-dimethylbenzylphenol)
α,α'-di(2-hydroxy-3-cyclohexyl-5-methylphenyl)dimethylether
α,α'-di(2-hydroxy-3-α-tolylethyl-5-methylphenyl)dimethyl sulfide
2-α-phenylethyl-4-methylol phenol
2-methylol-4-methyl-6-dimethylbenzylphenol
2-cyclohexyl-4-β-hydroxyethylphenol
2-methoxymethyl-4-methyl-6-α-p-tolylethylphenol
2,2'-methylenebis(2,4-dimethylphenol)
α,α'-di(2-hydroxy-3-butyl-5-methylphenyl)dimethylether
α,α'-di(2-hydroxy-3,5-dimethylphenyl)dimethyl sulfide
2-methyl-4-methylolphenol
2-ethyl-4-β-hydroxyethylphenol
2-cyclohexyl-4-methylolphenol
2,2'-methylene bis(6 tert. butyl-4-methylphenol)
4,4'-methylenebis(2,6-ditert. butylphenol)
4,4'-isopropylidenebis(2-tert. hexylphenol)
α,α'-di(2-hydroxy-3-butyl-5-tert. amylphenyl)dimethylether
α,α'-di(2-hydroxy-3-tert. hexyl-5-methylphenyl)dimethyl sulfide
2-tert. octyl-4-methylolphenol
2-methylol-4-methyl-6-tert. butylphenol
2,6-ditert. butyl-4-β-hydroxyethylphenol
2-methylcyclohexyl-4-methylol-6-tert. hexylphenol
2-methyl hydroquinone
tert. butyl catechol
tert. butyl resorcinol
ditert. butyl catechol
ditert. amyl resorcinol
2-tert. hexyl hydroquinone
2-α-phenylethyl hydroquinone
2-methylcyclohexyl hydroquinone
2,5-ditert. butyl hydroquinone
2,5-ditert. amyl hydroquinone
2,5-ditert. hexyl hydroquinone
2,5-di(α-phenylethyl)hydroquinone
2,5-di(dimethylbenzyl)hydroquinone
2-tert. butyl-5-tert. octyl hydroquinone
2-tert. butyl-5-α-phenylethyl hydroquinone The phenolic compounds used in the practice of the present invention can be prepared by various methods well known in the art. For example, methylene bis phenols can be prepared as described in U.S. Pat. No. 2,538,355 (Example 5). Bis phenols containing a —CH$_2$—S—CH$_2$— linkage can be prepared as described in U.S. Pat. No. 3,272,869. Bis phenols containing an —O— linkage can be prepared as described in Burchalter et al., Journal of the American Chemical Society, 68, 1896 (1946). Methylol substituted phenols and bis phenols containing a —CH$_2$—O—CH$_2$— linkage can be prepared as disclosed in Walker, "Formaldehyde," ACS Monograph Series, Reinhold Publishing Corporation, 310–314 (1964). α,α'-Dihydroxy xylene type compounds can be prepared as described in U.S. Pat. No. 2,666,786. Alkylated mononuclear dihydroxy compounds may be prepared as described in British Pat. No. 596,461. Phenols containing a methylol substituent can be prepared as described in U.S. Pat. No. 3,030,428. Phenols containing a —CH$_2$—O—CH$_2$— radical can be prepared as described in U.S. Pat. No. 2,954,345.

Various substituents such as alkyl, cycloalkyl and aralkyl radicals may be attached to the phenolic nucleus by many well known methods. For example, an alkyl radical may be attached to a phenolic nucleus by reacting a phenol with an olefin in the presence of a Friedel-Craft catalyst. It is not intended to limit the scope of the present invention by the method of preparation of the phenolic compounds since the methods of making the compounds is not critical to the practice of the present invention.

Examples of phosphites which can be used in the practice of the present invention are as follows:

tris(p-hexylphenyl) phosphite
tris(nonylphenyl) phosphite
tris(amylphenyl) phosphite
tris(cyclohexylphenyl) phosphite
tris(cyclopentylphenyl) phosphite
tris(methylcyclohexylphenyl) phosphite
tris(α-phenylethylphenyl) phosphite
tris(p-benzylphenyl) phosphite
tris(dimethylbenzylphenyl) phosphite
di(nonylphenyl) cyclohexylphenyl phosphite
nonylphenyl-di(α-phenylethylphenyl) phosphite
nonylphenyl, cyclohexylphenyl, benzylphenyl phosphite The phosphite compounds which can be used in the practice of the present invention can be prepared by various methods well known in the art, for example, as described in U.S. Pat. No. 2,733,226 and U.S. Pat. No. 3,244,661. It is not intended to limit the scope of the present invention by the method of preparation of the phosphite compounds since the methods of making the compounds is not critical to the practice of the present invention.

Both the epoxy compounds of the present invention and the other polyvinylchloride stabilizers are well known in the art of polyvinylchloride stabilization.

The epoxy compounds of the present invention are those which are a fairly standard component of PVC compositions. They can be based on the epoxidation of natural oils such as soybean, tall oil or unsaturated fatty esters, e.g., butyl epoxy stearate, condensation products of epichlorohydrin and bisphenol or derivatives of cyclohexene oxide. The epoxy plasticizers most commonly encountered include the "polymeric" epoxidized glycerides. These materials, commonly referred to as epoxidized soya oils, are not true polymerics but have been given that designation because of their resemblance to the true polyester plasticizers in such properties as low gasoline, oil and soapy water extraction. They are also extremely low in volatility, again simulating the true polymeric types in this regard. The epoxies also include the monomeric esters of epoxystearic acid, e.g., the butyl and octyl epoxystearic acid, e.g., the butyl and octyl epoxystearates and epoxytallates. The epoxy plasticizers are not pure chemical compounds but are mixtures. This applies both to the monoester epoxides and the epoxidized glycerides, but particularly to the glycerides. These naturally occurring glycerides (most commonly soya oil) are usually epoxidized in a solvent system through the use of hydrogen peroxide and a catalyst.

To further describe these organic epoxy stabilizers, materials of this class include, for example, glycidyl ethers of polyalkylene glycols as described in U.S. 2,555,169 to Voorthuis; the various epoxy resins, for example, resins prepared by reacting epichlorohydrin with polyfunctional phenols, such as diphenylolpropane, alkyloxy- or aryloxy-substituted aliphatic epoxy compounds, such as phenoxy-propylene oxide, butoxy-propylene oxide and the like as described by Wiley et al. in U.S. 2,160,948; epoxidized oils, e.g., triglycerides containing the epoxy group, such as triglycerides which contain at least one double bond and may be natural such as animal and vegetable fats and oils or synthetic triglycerides and related materials such as unsaturated fatty acid esters of polyhydric alcohols, which have been epoxidized, e.g., by reaction with peracetic acid as described by Swern et al. in U.S. 2,569,-502, e.g., epoxidized lard oil, olive oil, peanut oil, cottonseed oil, soybean oil, corn oil, linseed oil, menhaden oil and the like.

The other, i.e., non-epoxy stabilizers of polyvinylchloride of the present invention are well known in the stabilization of PVC. They are represented by the organotin mercaptides, e.g., dibutyltin di(lauryl mercaptide), dibutyltin di(isooctyl thioglycolate), dibutyltin mercaptide-carboxylates, polymeric tin mercaptides and octyltin stabilizers, i.e., the octyl analogs of the butyltin stabilizers, the organotin maleates, e.g., dibutyltin maleate, dibutyltin di(monoalkyl maleates) and octyl analogs, e.g., the octyltin maleates such as dioctyltin maleate, and octyltin mercaptide; miscellaneous organotins such as dibutyltin dilaurate and dibutyltin laurate maleate; barium-cadmium stabilizers; stabilizers based on calcium and zinc salts and lead stabilizers, such as the organo-leads and lead salts such as tribasic lead sulfate, basic lead carbonate and basic lead silicate.

Examples of polyvinylchloride stabilizers which can be used in the practice of the present invention are as follows:

dibutyltin mercaptide
dibutyltin mercapto esters
dibutyltin maleates
dibutyltin laurate
dioctyltin mercaptide
dioctyltin mercapto esters
dioctyltin maleates
dioctyltin laurate
tin carboxylates
barium cadmium carboxylates
barium cadmium complexes
calcium carboxylates
calcium zinc carboxylates Preferably the non-epoxy PVC stabilizers are metallic compounds, either organic or inorganic.

In order to give a more comprehensive disclosure of suitable classes and suitable individual stabilizers for polyvinyl chloride, all of which can be employed in the practice of the present invention, reference is made to the article "The Stabilization of Vinyl Resins," by H. Verite Smith, appearing in British Plastics, 25, pages 304–307 inclusive (September 1952). All of said article, and each of the thirty-one "Notes and References" appearing at the end thereof, are hereby incorporated by reference in the present application; in this manner unduly lengthening of the present application is avoided.

In the practice of the present invention, among the preferred organotin compounds and organolead compounds are the alkyl and aryl lead and tin compounds, such as tetraphenyl tin, dibutyl diphenyl tin, a mixture of dibutyl diphenyl tin plus 2-phenyl indole, fatty acid salts of alkyl and aryl lead such as tributyl lead ricinoleate, the oxides and hydroxides of alkyl, aryl and mixed alkyl and aryl tin and lead, e.g., dibutyl tin oxide, low polymers obtained by the hydrolysis of materials such as dibutyl tin diacetates, e.g., the diacetate of dianhydrotrisdibutylstannanediol which has the following structure where $C_4$ means butyl:

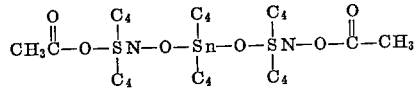

dialkyl lead and tin dicarboxylates, e.g., dibutyl tin dilaurate, and in general all of the organo-lead and -tin compounds disclosed in the following patents to Victor Yngve: 2,219,463; 2,267,777; 2,267,778; 2,267,779; 2,307,090; 2,307,092. Also of particular interest are mixtures of dialkyl tin dicarboxylates, such as dibutyl tin dilaurate, and their hydrolysis polymers, with calcium acetoacetate, epoxy resins, barium and cadmium ricinoleates and glycidyl ethers of polyalkyleneglycols, e.g., 2,3-epoxybutyl ether of diethylene glycol. Other suitable materials are the alkyl tin alcoholates, modified alkyl tins, e.g., tetra-α-thienyl tin disclosed by Fincke and Gluesenkamp in U.S. No. 2,479,918, and organo-tin salts of the α,β-unsaturated carboxylic acids, e.g., dibutyl tin maleate and crotonate, triethyl lead hexyl maleate and mixtures of triethyl lead hexyl maleate and dibutyl diphenyl tin.

A variety of basic lead compounds, some of which can also be classified as organo-lead compounds, can be used, such as lead carbonate, lead stearate, hydrous tribasic lead sulfate, lead silicate especially mixed with silica gel, basic lead phosphate, dibasic lead phthalate, basic lead acylates, e.g., basic lead 2-ethylhexoate, normal lead silicate, dibasic lead stearate, dibasic lead phosphate, dibasic lead phosphite; it is sometimes advantageous to employ cinnamic acid monoethoxymaleate, and other synergists with the basic lead stabilizer.

Other materials which are stabilizers for polyvinyl chloride and which can be employed to stabilize DVB polymers in accordance with the present invention include a variety of metallic soaps, i.e., metallic salts of saturated fatty acids, especially those containing from 8 to 20 carbon atoms, for example the stearates of calcium, barium, cadmium, lead, lithium, strontium, magnesium, zinc, aluminum, tin, bismuth. It is sometimes advantageous to include with these materials alkyl or aryl phosphites. Further, it is often found that mixtures of two of these materials are better than either alone, for example, mixtures of cadmium and lead stearate, mixtures of barium and zinc stearate, etc. Similar metal salts of unsaturated acids can also be used, such as the metal ricinoleates, especially those of cadmium and barium, such materials also being among those classed as antioxidants in the theoretical scheme of polyvinyl chloride stabilizers, in view of their unsaturated acid radical.

In general, weak bases are found to be useful, many of the compounds mentioned hereinabove such as the basic lead compounds and the metallic soaps being examples of weak bases. Simple materials such as sodium carbonate, basic lead carbonate, and even calcium oxide are effective.

Those stabilizers for polyvinyl chloride particularly noted as dienophiles, which of course include some of the materials mentioned hereinabove, can also be employed in the practice of the present invention, for example, maleic anhydride, compounds of the nature of triethyl lead hexylmaleate as disclosed in the patent to W. R. Richard, U.S. 2,477,349, monoalkoxy ethyl esters of fumaric and maleic acids used in conjunction with basic lead compounds as disclosed in the patent to J. R. Darby, U.S. 2,539,362, alkaline earth metal salts of alpha-beta, gamma-delta unsaturated monobasic acids such as calcium sorbate, barium alpha-furacrylate, as well as chelates such as the methyl derivatives of 1,3-dicarboxylic compounds, e.g., calcium ethylacetoacetate, barium diisopropyl salicylate and the like.

The foregoing listings are not to be construed as being a complete list of all materials which can be employed in the practice of the present invention. Other specific compounds, and classes of compounds, not given above also are effective to stabilize polyvinyl chloride and thus are within the broad scope of the present invention. Thus, for example, there can be mentioned the substituted ureas such as diphenylurea, diphenylthiourea, para-ethoxyphenylurea, N,N'-bis-(p-ethoxyphenyl)urea, especially when employed with basic salts such as sodium carbonate, basic lead salts and the like. The disclosure given herein will, however, serve to advise those skilled in the art of the general groups of materials contemplated, as well as particular classes and specific stabilizers preferred to be used. Attention is again specifically directed to the article by Smith in British Plastics referred to above, particularly the table on page 306 listing American proprietary stabilizers by the source company and brand together with compositions, each and all of which commercially available stabilizers can be employed in the practice of the present invention to stabilize the DVB type polymers.

Polymers offered particularly effective protection in the practice of the present invention are polymers containing (A) 55 to 84.9 parts by weight of bound 1,3-butadiene monomer, (B) 0.10 to 2.5 parts by weight of bound divinyl benzene and (C) 15 to 44.9 parts by weight of at least one bound monomer selected from the group consisting of styrene and acrylonitrile wherein the sum of (A) plus (B) plus (C) equals 100 parts by weight of polymer.

The polymers stabilized by the practice of the present invention can be made by well known emulsion polymerization techniques involving the emulsion polymerization of monomer systems comprising 1,3-butadiene, acrylonitrile and divinyl benzene. For example, a butadiene/acrylonitrile/divinyl benzene polymer may be prepared according to the disclosure at column 3, lines 16 to 35 of U.S. Pat. No. 2,927,093. A similar system could be used where styrene is substituted for the acrylonitrile.

The stabilizers of the present invention can be incorporated into the polymers of the present invention by any of the conventional methods such as by open mill mixing, Banbury mixing and the addition of solutions, emulsions, suspensions or dispersions of the stabilizers to solutions, emulsions, suspensions or dispersions of the polymers. The method of incorporations is not critical and the order of addition of the components of the system is not critical. If the compound is water soluble, it is preferred that it not be added to an aqueous latex. Also, it can be preferable to add the stabilizer to the latex if the polymer is made by emulsion polymerization rather than delaying addition until after coagulation and drying, particularly where these processing steps are severe, so as to prevent degradation during processing. Since the primary purpose of the present invention is to prevent post polymerization crosslinking, the entire stabilization system must be added prior to exposure of the polymer to conditions that could result in substantial post polymerization crosslinking if the polymer were not stabilized. Such conditions include high temperature processing and storage for extensive periods of time.

The stabilizer system of the present invention offers protection whether the polymer contains other conventional compounding ingredients or not.

All of the components of the stabilizer system of the present invention, i.e., the phenolics, the epoxy stabilizers, the other polyvinylchloride stabilizers and in one embodiment, the phosphite stabilizers, are all well known in the art. The phenolic/epoxy stabilizer/other PVC stabilizer system provides the polymers of the present invention with improved resistance to post polymerization crosslinking, i.e., a degree of resistance superior to that which can be obtained with any of the individual components or any two-component combinations thereof.

Polymers of the present invention are stabilized by the addition normally of 0.65 to 7.0 parts by weight per 100 parts by weight of the polymers of the phenol/phosphite/epoxy/nonepoxy combination or 0.60 to 7.0 parts by weight of the phenol/epoxy/nonepoxy combination of the present invention, although from about 0.65 part to 5.0 parts by weight per 100 parts by weight of polymer is normally adequate, while a preferred range is from about 0.65 part to 3.0 parts by weight per 100 parts by weight of polymer. The amount of total stabilizer will vary depending on the stabilizer components used, the polymer being stabilized and the severity of the degradation conditions to which it is exposed. Where the epoxy stabilizer is used in large amounts, the total stabilizer system can be used in amounts in excess of 30.0 parts by weight. The components of the stabilizer system can be added to the polymer separately, together or in any order. Normally the phenolic stabilizer is used at levels from 0.05 to 2.0 parts per 100 parts by weight of polymer and preferably from 0.10 to 0.30 parts. The epoxy stabilizer is normally used at levels from 0.5 to 30.0 parts by weight, although a range of 0.50 to 3.0 parts is preferred. If a phosphite is used, it is used at a level of from 0.05 to 2.0 parts and preferably from 0.20 to 0.40 part. The other polyvinyl chloride stabilizer is used at levels from 0.05 to 10.0 parts by weight and preferably from 0.10 to 2.0 parts. When the metallic stabilizer is an organo-tin type, the amount used is normally from 0.05 to 3.0 parts and preferably from 0.10 to 0.30 part. When it is of the barium-cadmium type, it is normally used at levels from 0.25 to 10.0 parts and preferably from 0.50 to 2.0 parts. The amount of stabilizer will vary depending on which stabilizer is being used. Optimum amounts can routinely be determined by one of ordinary skill in the art.

Some of the DVB-containing polymers described herein are used in automotive crash-pads. Sunlight and heat can result in what is widely known within the automobile industry as a fogging problem wherein materials volatilize from the crash-pad skin and condense on the automotive windshield. The present invention permits the use of lower levels of individual stabilizers, which results in a reduced tendency for fogging.

The following examples are representative but not restrictive of the practice of the present invention.

EXAMPLE 1

A butadiene/acrylonitrile/DVB polymer latex having a bound monomer ratio of approximately 70/30/0.25 is prepared by emulsion polymerization. The polymer possesses an ML-4/212° F. of 100 to 120. Various components of various stabilizer systems are added to various portions of the latex as follows. Those compounds capable of ready emulsification are emulsified. Those compounds which are not readily emulsifiable are dissolved in a solvent and the solution emulsified. Solid compounds may also be added in the form of a dispersion. The emulsions are added to the butadiene/acrylonitrile/DVB latex under agitation. The resulting latex is coagulated using using magnesium sulfate and the polymer crumb washed with water and dried. The stabilization system for the polymer stocks are shown in Table I.

The color of the dried polymer is observed and recorded. After preparation portions of each of the polymers containing the stabilizers are subjected to a hot mastication for 60 minutes at 170° C. in a Brabender Corporation Plastograph (Model PL-750) equipped with a Banbury style mixing head, at a rotor speed of 50 r.p.m. The Plastograph torque is recorded versus time during the mastication and the conditions of the masticated polymer, after complete mastication, observed and recorded. Mooney viscosities (ML-4/212° F.) measurements, or Olson flow measurements from which Mooney viscosity calculations can be made, are made before and after mastication.

The figure depicts a torque curve which is representative of the behavior of a polymer used within the practice of the present invention when masticated in a Brabender Plastograph without adequate stabilization against post polymerization DVB type crosslinking. It is theorized that the hump in the curve results from post polymerization DVB crosslinking, since the polymers which do not exhibit post polymerization crosslinking do not exhibit such a hump. Materials that are considered particularly effective as aids in preventing post polymerization DVB crosslinking are those which either completely remove the hump in the torque curve or appreciably diminish it or delay its formation.

Mooney viscosity rise during mastication and the masticated condition of the polymer are considered to be some measure of degradation to the polymer. A high Mooney rise indicates greater degradation. A masticated polymer in a crumbled condition indicates degradation while a polymer in a massed or semimassed condition indicates lack of degradation or reduced degration.

Fogging or fog testing is commonly used in the automotive industry to judge the acceptance of crash pads, door liners, and other sheeted plastic/rubber combinations. The General Motors Corporation Fisher Body Division Fog Test is commonly used for this purpose. This test and modifications thereof can be used in the testing of gum elastomers. Basically the test involves heating a dried sample polymer is in a closed container beneath a piece of window glass for a period of time, the top of the glass plate being maintained at a temperature below that of the polymer. The apparatus is disassembled and the plate is allowed to cool. The plate is then usually observed to determine the extent of fog deposits.

C. using a Friedel-Crafts type catalyst. One mol of the dicyclopentadiene is used with at least one mol of the phenolic material. In the second stage the first stage reaction product is reacted in the presence of an acidic alkylation catalyst with at least one-half mol of isobutylene. For example, two stage phenolic reaction product could be used in Stocks D and E along with the other compounds. The first stage involves a reaction mixture of 3 mols of p-cresol and 1 mol of dicyclopentadiene. It is run at a temperature of approximately 180 to 185° F. using a boron trifluoride catalyst. The second stage involves a reaction mixture of approximately 3 parts by weight of the stripped first stage reaction product and about 1 part by weight of isobutylene using toluene sulfonic acid as the catalyst and toluene as the solvent at approximately 180 to 185° F.

The stabilizer systems of the present invention as described earlier herein will perform in the polymers of the present invention as described earlier herein in essentially the same manner as the stabilizer systems of the present invention used in the above working example.

TABLE I

| Stock | Phenol stabilizer | PVC stabilizer | Epoxy stabilizer | Phosphite stabilizer |
|---|---|---|---|---|
| A | 0.20 part 2,5-di-t-amylhydroquinone. | | | |
| B | | 0.20 part polymeric tin mercaptide.[1] | | |
| C | | | 1.5 parts polymeric epoxy.[2] | |
| D | 0.20 part 2,5-di-t-amylhydroquinone. | 0.20 part polymeric tin mercaptide.[1] | do | |
| E | do | do | do | 0.30 part tris nonylphenyl phosphite. |
| F | 0.65 part 2,5-di-t-amylhydroquinone. | | | |

[1] Cardinal Clear 7M-1, percent chloride as Cl⁻, less than 1.0; mercapto sulfur percent, 14.0 to 14.5; and tin content percent, 25.5 to 26.0.
[2] Emery 3924, possesses a typical acid value of 2.6 mg. KOH/gm. (ASTM D-1980-61) and a typical oxirane oxygen value of 3.7 (ACOS Cd 9-57 tentative).

Stocks D and E contain stabilization systems used within the practice of the present invention. Stocks A, B, C and F do not.

Stocks D and E are superior to Stocks A, B and C in that they remove the hump in the Brabender curve, diminish it or delay its formation and/or reduce the Mooney viscosity rise and/or improve the masticated condition of the polymer. Although by increasing the phenolic level (compare Stocks A and F) the resistance to post polymerization crosslinking is improved, unfortunately the increase in phenolic level also increases the tendency to fog. By using stabilization systems of the present invention (Stocks D and E), applicant not only provides effective protection against post polymerization crosslinking, but also does so with minimal tendency to fog. In fact, this is the prime purpose of the present invention, that is to provide effective post polymerization crosslinking protection while at the same time reducing the tendency of the stabilization system to add to the fogging problem. A secondary purpose of the present invention is to provide improved resistance to post polymerization crosslinking.

Since it is desirable that polymers of the present invention possess good long term mixing and post vulcanization stability, a phenolic compound which is known to provide good long term and post vulcanization stabilization can be added to the stabilizer combination of Stocks D and E.

Stabilizers quite effective as post vulcanization stabilizers which may be used as long term stabilizers are two stage reaction products where in the first stage a mixture of one or more of the following: phenol, p-cresol, mixed m-p-cresol and p-ethyl phenol; and dicyclopentadiene are reacted at a temperature of about 25 to 160°

Butadiene/styrene/DVB (e.g., 70/30/0.25 butadiene/styrene/DVB) polymers and butadiene/DVB (e.g., 100/0.25 butadiene/DVB) polymers as described earlier herein can also be inserted into the previous working examples for the butadiene/acrylonitrile/DVB polymer to benefit from the stabilization systems of Stocks D and E.

In addition any of the other phenolic compounds, epoxy compounds, other polyvinyl stabilizers and phosphite stabilizers as described generically earlier herein and also as specifically illustrated earlier herein can be inserted in the previous working examples for their counterparts in Stocks D and E to provide the beneficial results of this invention.

The compounds can be used in Stocks D and E in the amounts described or within the ranges described broadly for the components earlier herein. For example, the phenol can be used at 0.10, 0.20, 0.40, 1.0 part and higher while the epoxy stabilizer can be used at, for example, 0.5, 1.5, 5.0, 10.0 and 30.0 parts level. Also, for example, other polyvinylchloride stabilizers can be inserted in the working examples at levels of 0.10, 0.20, 0.40, 1.0 part and higher. The phosphites can also be used, for example, at levels of 0.10, 0.20, 0.40, 1.0 part and higher. Lower levels are desirable normally however to reduce the fogging tendency. For example, the following phenolic compounds can be inserted for 2,5-di-t-amylhydroquinone in Stocks D and E.

4,4'-butylidene-bis-(6-tert. butyl-m-cresol)
2,6-ditert. butyl-4-methylol phenol
4,4'-methylene bis-(2,6-ditert. butyl phenol)
$\alpha,\alpha'$-di(4-hydroxy-3,5-ditert. butyl phenyl) dimethyl ether
A.O. 439, an alkylated bis phenol having a dimethyl sulfide linkage Examples of other epoxy compounds which can be inserted in Stocks D and E for the Emery 3924 include epoxidized soybean oils, for example:

|  | Typical oxirane oxygen, percent | Acid number |
|---|---|---|
| Paraplex G-62 | | |
| Admex 710 | | |
| Drapex 6.8 | 6.6 | 0.9 |
| Monomeric epoxyester (octyl epoxy stearate) (Drapex 3.2) | 3.5 | 0.4 |
| Monomeric epoxyester (octyl epoxy tallate) (Drapex 4.4) | 4.5 | 0.7 |
| Epoxidized tallate (Admex 711) | | |

Examples of other polyvinyl stabilizers which can be inserted in Stocks D and E for the Cardinal Clear 7M-1 include:

Maleic anhydride
Calcium-zinc organic stabilizer (Mark 133)
Barium-cadmium-zinc stabilizer (Mark 54)
Barium-cadmium stabilizer (Thermolite 112)
Dibutyl tin mercaptide (Thermolite 20)
Dibutyl tin mercapto esters (Thermolite 31)
Dibutyl tin maleate (Thermolite 24)
Dioctyl tin (Thermolite 831)
Barium-cadmium laurate (Mark XI)
Barium-cadmium laurate (Advastab BC-12)
Tribasic lead maleate monohydro (Tri-Mal)
Dibasic lead stearate (DS-207)

Other phosphites which could have been substituted for the tris nonyl phenyl phosphite include:

tris (p-hexylphenyl) phosphite
tris (cyclohexylphenyl) phosphite
tris ($\alpha$-phenylethylphenyl) phosphite The compounds, instead of having been added to a latex, could also have been added to a solid polymer on a mill or in a Banbury.

The stabilization system described herein will normally operate effectively in the presence of most conventional compounding ingredients.

A butadiene/styrene/DVB polymer containing about 30 to 32 percent bound acrylonitrile and about 0.3 percent DVB was stabilized with the following formulations. All components were added to the polymer on a mill. Each sample was milled at 325° F. until roughness occurred.

| Stock | Tris nonyl phenyl phosphite (parts) | 2,5-di-t. amyl hydroquinone | Paraplex G-62[1] | Cardinal Clear 7M-1 |
|---|---|---|---|---|
| G | 0.3 | | | |
| H | 0.3 | 0.3 | | |
| I | 0.3 | 0.3 | 1.5 | |
| J | 0.3 | 0.3 | 1.5 | 0.30 |

[1] Epoxidized soybean oil.

Prior to coagulation the polymer was stabilized by the addition of an alkylated p-cresol/dicyclopentadiene stabilizer to the latex in the amount of 0.5 part per 100 parts of polymer. Stock J contains a stabilizer within the scope of the present invention. As the mill data indicate, Stock J was far superior to Stocks G, H and I. Other polymers and stabilizers as described earlier herein could also have been used with beneficial results.

The present invention provides butadiene/acrylonitrile/ and/or styrene DVB polymers with increased stability against post polymerization crosslinking and oxygen degradation and, where the organo tin stabilizers are used, good original color. It also permits the rise of lower levels of individual stabilizers thereby resulting in a reduced tendency to fog.

While certain representative embodiments and details have been shown for the purpose of illustrating the invention, it will be apparent to those skilled in this art that various changes and modifications may be made without departing from the spirit or scope of the invention.

What is claimed is:

1. A polymer containing (A) 40 to 99.95 parts by weight of bound 1,3-butadiene monomer, (B) .05 to 5.0 parts by weight of bound divinyl benzene monomer and (C) 0 to 59.95 parts by weight of at least one bound monomer selected from the group consisting of styrene and acrylonitrile wherein the sum of (A) plus (B) plus (C) equals 100 parts by weight of polymer and having incorporated therein a stabilizing amount of a stabilizing composition comprising (a) at least one phenolic compound selected from the group consisting of compounds conforming to the following structural formulae:

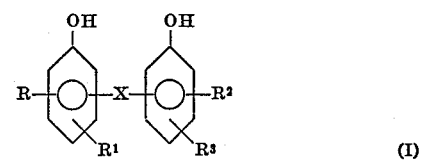

wherein R, $R^1$, $R^2$ and $R^3$ are selected from the group consisting of hydrogen, alkyl radicals containing 1 to 12 carbon atoms, cycloalkyl radicals containing 5 to 9 carbon atoms and aralkyl radicals containing 7 to 12 carbon atoms and X is selected from the group consisting of

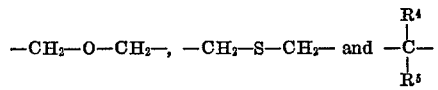

wherein $R^4$ and $R^5$ are selected from the group consisting of hydrogen and alkyl radicals containing 1 to 7 carbon atoms and the sum of the carbon atoms in $R^4$ plus $R^5$ is 0 to 7; and

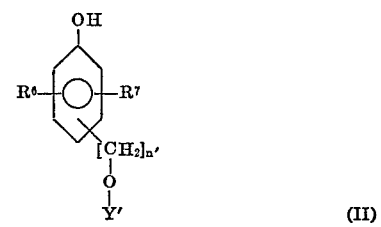

wherein $R^6$ and $R^7$ are selected from the group consisting of hydrogen, alkyl radicals containing 1 to 12 carbon atoms, cycloalkyl radicals containing 5 to 9 carbon atoms and aralkyl radicals containing 7 to 12 carbon atoms; $n'$ is an integer from 0 to 1; and $Y'$ is selected from the group consisting of hydrogen and alkyl radicals containing 1 to 2 carbon atoms, (b) at least one epoxy stabilizer/ plasticizer for polyvinylchloride selected from the group consisting of (1) epoxidized natural oils,
(2) monomeric esters of epoxystearic acid,
(3) glycidyl ethers of polyalkylene glycols and
(4) epoxy resins and (c) at least one other stabilizer for polyvinylchloride selected from the group consisting of (1) a metallic salt of a saturated fatty acid selected from the group consisting of calcium, barium, cadmium, lead, lithium, strontium, magnesium, zinc and tin salts of organic acids,
(2) organo-tin compounds,
(3) organo-lead compounds and
(4) inorganic lead salts wherein the entire stabilizing composition is added prior to exposure of the polymer to conditions that could result in substantial post polymerization crosslinking.

2. The polymer according to claim 1 which contains as a fourth component at least one phosphite having the following structural formula:

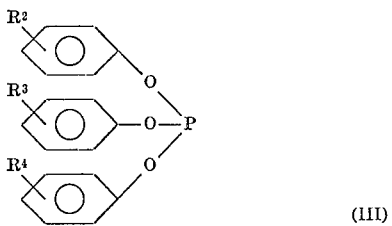

(III)

wherein $R^2$ is selected from the group consisting of alkyl radicals containing 4 to 12 carbon atoms, cycloalkyl radicals containing 5 to 9 carbon atoms and aralkyl radicals containing 7 to 12 carbon atoms and $R^3$ and $R^4$ are selected from the group consisting of hydrogen, alkyl radicals containing 4 to 12 carbon atoms, cycloalkyl radicals containing 5 to 9 carbon atoms and aralkyl radicals containing 7 to 12 carbon atoms.

3. The polymer according to claim 2 wherein the metallic salt of a saturated fatty acid is selected from the group consisting of barium-cadmium stabilizers and stabilizers based on calcium and zinc salts.

4. The polymer according to claim 2 wherein the epoxy stabilizer/plasticizer is an epoxidized natural oil and the other stabilizer for polyvinylchloride is an organo-tin compound.

5. The polymer according to claim 4 wherein the organo-tin compound is selected from the group consisting of organo-tin mercaptides, organo-tin maleates and organo-tin laurates, and the epoxidized oil is selected from the group consisting of epoxidized tall oil and epoxidized soybean natural oils.

6. The polymer according to claim 5 wherein the organo-tin compound is a polymeric tin mercaptide and the epoxidized natural oil is epoxidized soybean oil.

7. The polymer according to claim 6 wherein the phenolic compound is 2,5-ditertiaryamyl hydroquinone and the phosphite is trisnonylphenyl phosphite.

8. The polymer according to claim 2 wherein the polymer contains (A) 55 to 84.9 parts by weight of bound 1,3-butadiene monomer, (B) 0.10 to 2.5 parts by weight of bound divinyl benzene and (C) 15 to 44.9 parts by weight of at least one bound monomer selected from the group consisting of styrene and acrylonitrile, wherein the sum of (A) plus (B) plus (C) equals 100 parts by weight of polymer.

References Cited
UNITED STATES PATENTS

| | | | |
|---|---|---|---|
| 2,569,502 | 10/1951 | Swern et al. | 260—348 |
| 2,690,435 | 9/1954 | Albert | 260—45.75 X |
| 2,733,226 | 1/1956 | Hunter | 260—45.8 X |
| 2,849,420 | 8/1958 | Stevens et al. | 260—45.75 |
| 3,530,069 | 9/1970 | O'Neill | 260—45.75 X |

DONALD E. CZAJA, Primary Examiner

D. J. BARRACK, Assistant Examiner

U.S. Cl. X.R.

260—23.5 R, 45.7 P, 45.7 S, 45.75 R, 45.75 K, 45.8 A, 45.95, 80.7